United States Patent
Ito

(10) Patent No.: US 10,300,744 B2
(45) Date of Patent: May 28, 2019

(54) TIRE

(71) Applicant: Sumitomo Rubber Industries, Ltd., Kobe-shi, Hyogo (JP)

(72) Inventor: Kae Ito, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 26 days.

(21) Appl. No.: 15/804,310

(22) Filed: Nov. 6, 2017

(65) Prior Publication Data

US 2018/0126793 A1 May 10, 2018

(30) Foreign Application Priority Data

Nov. 7, 2016 (JP) .................................. 2016-217460
Nov. 7, 2016 (JP) .................................. 2016-217461

(51) Int. Cl.
*B60C 11/12* (2006.01)
*B60C 11/03* (2006.01)
*B60C 11/13* (2006.01)

(52) U.S. Cl.
CPC ...... *B60C 11/1236* (2013.01); *B60C 11/0306* (2013.01); *B60C 11/1204* (2013.01);
(Continued)

(58) Field of Classification Search
CPC ............. B60C 11/1236; B60C 11/0306; B60C 11/1204; B60C 11/1369; B60C 11/125;
(Continued)

(56) References Cited

U.S. PATENT DOCUMENTS

2005/0103414 A1* 5/2005 Suzuki .................... B60C 11/12
152/209.5
2012/0216931 A1 8/2012 Shiono
(Continued)

FOREIGN PATENT DOCUMENTS

JP 04331608 A * 11/1992 ............. B60C 11/13
JP 05330319 A * 12/1993
(Continued)

OTHER PUBLICATIONS

Machine translation of JP2013-189099 (no date).*
Machine translation of JP05-330319 (no date).*
Machine translation of JP04-331608 (no date).*

*Primary Examiner* — Justin R Fischer
*Assistant Examiner* — Philip N Schwartz
(74) *Attorney, Agent, or Firm* — Birch, Stewart, Kolasch & Birch LLP

(57) ABSTRACT

A tire comprises a tread portion 2 comprising blocks 20. At least one of the blocks has a first block wall (25a), a second block wall (25b), and a first region (26a) and a second region (26b) divided by a crossing sipe 30. In a plan view, the first and second block walls (25a) and (25b) are each formed in a convex V-shape so as to have an apex portion 27 protruding toward the outside of the block. The crossing sipe 30 has a first end (28a) positioned on a first side of the apex portion 27 of the first block wall (25a) and a second end (28b) positioned on a second side of the apex portion 27 of the second block wall (25b) in the tire circumferential direction. The first and second regions (26a) and (26b) each have a closed sipe 38 having both ends terminating within the region.

18 Claims, 5 Drawing Sheets

(52) U.S. Cl.
CPC ........ *B60C 11/125* (2013.01); *B60C 11/1369* (2013.01); *B60C 2011/0346* (2013.01); *B60C 2011/0353* (2013.01); *B60C 2011/0365* (2013.01); *B60C 2011/1213* (2013.01); *B60C 2011/1254* (2013.01); *B60C 2200/06* (2013.01)

(58) Field of Classification Search
CPC ..... B60C 2011/1213; B60C 2011/1254; B60C 2011/0353; B60C 2011/0365; B60C 2011/0346; B60C 2200/06; B60C 2200/065
See application file for complete search history.

(56) References Cited

U.S. PATENT DOCUMENTS

2013/0098519 A1* 4/2013 Maehara ............ B60C 11/0306
152/209.22
2013/0186533 A1* 7/2013 Kaneko ................ B60C 11/032
152/209.17

FOREIGN PATENT DOCUMENTS

| JP | 2011-98622 A | | 5/2011 |
|---|---|---|---|
| JP | 2013189099 A | * | 9/2013 |

* cited by examiner

TIRE

TECHNICAL FIELD

The present invention relates to a tire capable of improving uneven wear resistance performance of blocks provided in a tread portion.

BACKGROUND ART

For example, Japanese unexamined Patent Application Publication No. 2011-98622 (Patent Literature 1) has proposed a tire provided with a plurality of blocks having hexagonal ground contacting surfaces. Each of the blocks disclosed in Patent Literature 1, is provided with a crossing sipe extending across the ground contacting surface in a tire axial direction.

Unfortunately, both ends of the crossing sipe disclosed in Patent Literature 1, both ends are connected to top portions of block walls projecting outwardly. Generally, large stress is applied to regions around the top portions of the block walls, therefore, the sipes disclosed in Patent Literature 1 tend to cause uneven wear around the top portions.

Further, in the blocks disclosed in Patent Literature 1, the uneven wear tends to occur in the ground contacting surface of each area divided by the crossing sipes.

As described above, the tire disclosed in Patent Literature 1 has room for further improvement of the uneven wear resistance performance of the blocks.

SUMMARY OF THE INVENTION

The present invention was made in view of the above, and a primary object thereof is to provide a tire capable of improving the uneven wear resistance performance of blocks.

In one aspect of the present invention, a tire comprises a tread portion comprising a plurality of blocks divided by a plurality of main grooves extending continuously in a tire circumferential direction and a plurality of lateral grooves connecting between the main grooves, at least one of the blocks having a first block wall and a second block wall abutting on the main grooves on both sides of the block, and being provided with a crossing sipe extending between the first block wall and the second block wall so as to have a first end thereof connected with the first block wall and a second end thereof connected with the second block wall, and a first region and a second region divided by the crossing sipe and positioned on both sides thereof in the tire circumferential direction, in a plan view of the at least one of the blocks, the first block wall and the second block wall are each formed in a convex V-shape so as to have an apex portion protruding toward the outside of the block, the first end of the crossing sipe is positioned on a first side in the tire circumferential direction of the apex portion of the first block wall, whereas the second end of the crossing sipe is positioned on a second side in the tire circumferential direction of the apex portion of the second block wall, and each of the first region and the second region is provided with a closed sipe having both ends terminating within the region.

In another aspect of the invention, it is preferred that at least a part of the crossing sipe is wavy.

In another aspect of the invention, it is preferred that at least a part of the crossing sipe extends straight.

In another aspect of the invention, it is preferred that the crossing sipe comprises a first portion extending from the first end in a wavy form in a tire axial direction, a second portion extending from the second end in a wavy form in the tire axial direction, and a third portion extending straight between the first portion and the second portion.

In another aspect of the invention, it is preferred that the first portion and the second portion are formed at different positions in the tire circumferential direction, and the third portion is inclined with respect to the tire axial direction.

In another aspect of the invention, it is preferred that the closed sipes extend in wavy shapes, and center lines of amplitudes of the wavy shapes of the closed sipes are inclined to same directions as the third portion.

In another aspect of the invention, it is preferred that the closed sipe provided in the first region and the closed sipe provided in the second region do not overlap each other when viewed in the tire axial direction.

In another aspect of the invention, it is preferred that each of the first region and the second region is divided into an apex portion side region and a non-apex portion side region by a block center line extending in the tire circumferential direction passing through a center position in the tire axial direction of a maximum width of the block provided with the crossing sipe, the apex portion side region is positioned on one side of the block center line and includes the apex portion of the first block wall or the second block wall, the non-apex portion side region is positioned on the other side of the block center line to have a smaller ground contacting surface area than the apex portion side region, and the closed sipes of the first region and the second region are provided in the respective apex portion side regions.

In another aspect of the invention, it is preferred that an entire body of each of the closed sipes is formed within the apex portion side region.

In another aspect of the invention, it is preferred that the tread portion comprises a crown land region defined between a pair of the main grooves adjacent to each other, said at least one of the blocks is a plurality of the blocks including a plurality of crown blocks arranged in the crown land region and divided by a plurality of crown lateral grooves, the crown blocks include first crown block whose crossing sipes each have the first end positioned on the first side in the tire circumferential direction of the apex portion of the first block wall and the second end positioned on the second side in the tire circumferential direction of the apex portion of the second block wall, and second crown blocks whose crossing sipes each have the first end positioned on the second side of the apex portion of the first block wall and the second end positioned on the first side of the apex portion of the second block wall.

In another aspect of the invention, it is preferred that the first crown blocks and the second crown blocks are arranged alternately in the tire circumferential direction.

In another aspect of the invention, it is preferred that each of the crown blocks is divided by the crossing sipe into the first region and the second region positioned on both sides of the crossing sipe in the tire circumferential direction, and each of the first region and the second region is provided with the closed sipe having the both ends terminating within the region.

In another aspect of the invention, it is preferred that the closed sipes provided in the first crown blocks and the closed sipes provided in the second crown blocks are inclined to opposite directions to each other.

In another aspect of the invention, it is preferred that in each of the crown blocks, the closed sipe provided in the first region and the closed sipe provided in the second region do not overlap each other in the tire axial direction.

In another aspect of the invention, it is preferred that each of the crossing sipe comprises a first portion extending from the first end in a wavy form in a tire axial direction, a second portion extending from the second end in a wavy form in the tire axial direction, and a third portion extending straight between the first portion and the second portion, and the closed sipe provided in each of the crown blocks extends along the third portion of the crossing sipe provided in the same block.

In another aspect of the invention, it is preferred that the tread portion comprises a middle land region defined between a pair of the main grooves adjacent to each other, said at least one of the blocks is a plurality of the blocks including a plurality of middle blocks arranged in the middle land region and divided by a plurality of middle lateral grooves, in each of the middle blocks, the first end of the crossing sipe is positioned on the second side in the tire circumferential direction of the apex portion of the first block wall and the second end of the crossing sipe is positioned on the first side in the tire circumferential direction of the apex portion of the second block wall.

In another aspect of the invention, it is preferred that each of the middle blocks is divided by the crossing sipe into the first region and the second region positioned on both sides of the crossing sipe in the tire circumferential direction, and each of the first region and the second region is provided with the closed sipe having the both ends terminating within the region.

In another aspect of the invention, it is preferred that the closed sipes provided in each of the middle blocks are inclined to same directions.

In another aspect of the invention, it is preferred that in each of the middle blocks, the closed sipe provided in the first region and the closed sipe provided in the second region overlap each other in the tire axial direction.

In another aspect of the invention, it is preferred that each of the crossing sipes comprises a first portion extending from the first end in a wavy form in a tire axial direction, a second portion extending from the second end in a wavy form in the tire axial direction, and a third portion extending straight between the first portion and the second portion, and the closed sipes provided in each of the middle blocks extend along the first portion or the second portion of the crossing sipe provided in the same block.

In another aspect of the invention, it is preferred that the tread portion comprises a crown land region and a middle land region each defined between a pair of the main grooves adjacent to each other, said at least one of the blocks is a plurality of blocks including a plurality of crown blocks arranged in the crown land region and divided by a plurality of crown lateral grooves and a plurality of middle blocks arranged in the middle land region and divided by a plurality of middle lateral grooves, each of the crown blocks and the middle blocks comprises the first region and the second region divided by the crossing sipe and positioned on both sides thereof in the tire circumferential direction, each of the first region and the second region is provided with the closed sipe having the both ends terminating within the region, each of the closed sipes extends in a wavy shape, center lines of amplitudes of the wavy shapes of the closed sipes provided in the crown blocks are inclined at angles θ1 with respect to the tire axial direction, and center lines of amplitudes of the wavy shapes of the closed sipes provided in the middle blocks are inclined at angles θ2 smaller than the angles θ1 with respect to the tire axial direction.

In another aspect of the invention, it is preferred that each of the crossing sipes comprises a first portion extending from the first end in a wavy form in a tire axial direction, a second portion extending from the second end in a wavy form in the tire axial direction, and a third portion extending straight between the first portion and the second portion, and at least one of the closed sipes provided in the middle blocks is formed at a position so as to overlap with a region obtained by projecting the first portion or the second portion of the crossing Sipe of one of the crown blocks in the tire axial direction.

DESCRIPTION OF THE PREFERRED EMBODIMENT

An embodiment of the present invention will now be described in conjunction with accompanying drawings.

Figure 1:
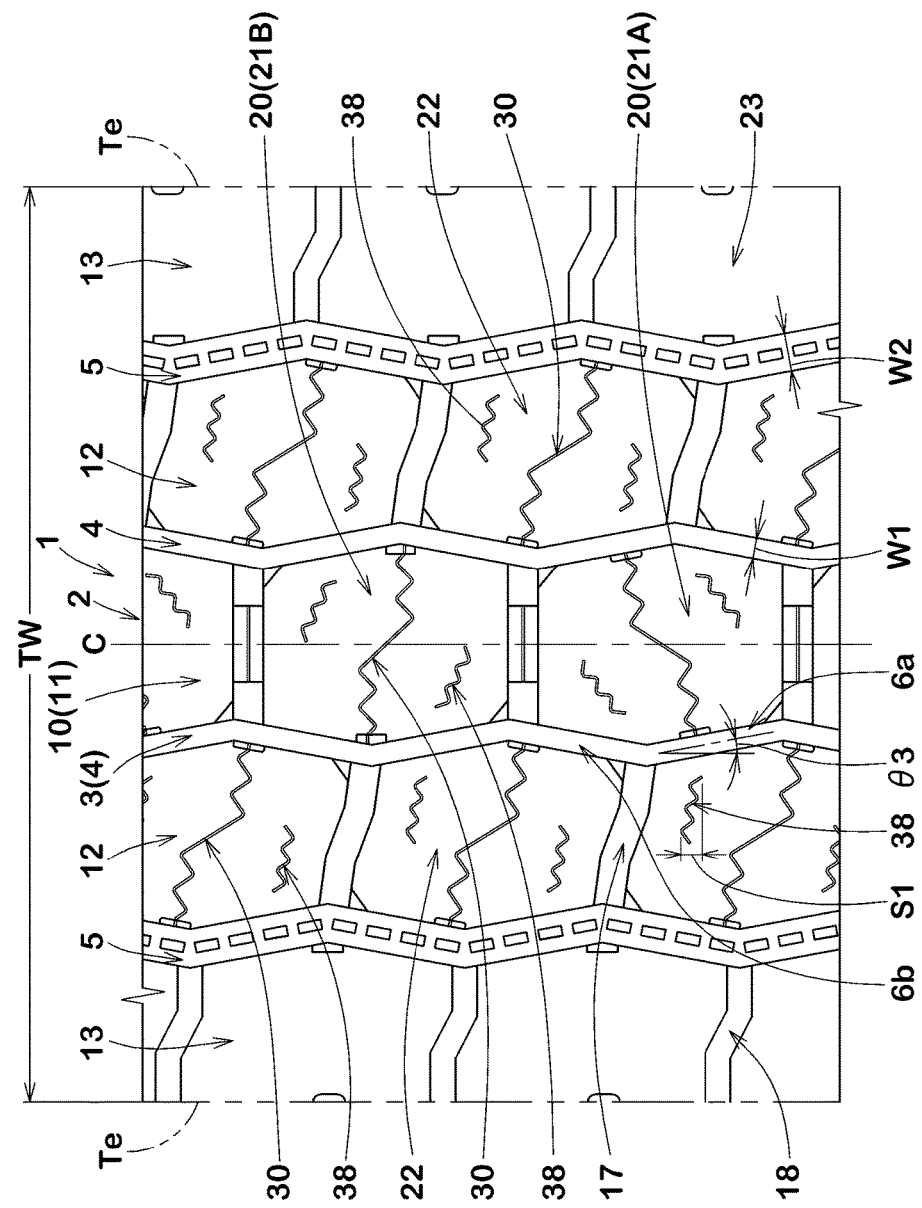
FIG. 1 is a development view of a tread portion of a tire according to an embodiment of the present invention.

FIG. 1 is a developed view of a tread portion 2 of a tire 1 showing an embodiment of the present invention. The tire 1 in this embodiment can be used for various tires such as a pneumatic tire for a passenger car and for heavy duty, and a non-pneumatic tire which is not filled with pressurized air, for example. The tire 1 in this embodiment is suitably used as a pneumatic tire for heavy duty such as a tire for trucks and buses, for example.

As shown in FIG. 1, the tread portion 2 of the tire 1 is provided with land regions 10 divided by a plurality of main grooves 3 extending continuously in a tire circumferential direction.

The main grooves 3 include, for example, crown main grooves 4 and shoulder main groove 5. For example, a pair of the crown main grooves 4 is provided on both sides, one on each side, of a tire equator. For example, each of the shoulder main grooves 5 is provided closest to each of tread edges (Te).

The "tread edges (Te)" are outermost ground contacting positions in a tire axial direction when the tire 1, in a case of a pneumatic tire, in a standard state is in contact with a flat surface with zero camber angle by being loaded with a standard tire load. The standard state is a state in which the tire 1 is mounted on a standard rim (not shown), inflated to a standard pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The crown main grooves 4 and the shoulder main groove 5 can be provided at arbitrary positions. For example, it is preferred that the crown main grooves 4 are arranged so that a distance between each of groove center lines thereof and the tire equator (C) is in a range of from 0.08 to 0.15 times a tread width TW. similarly, it is preferred that the shoulder main groove 5 are arranged so that a distance between each of groove center lines thereof and the tire equator (C) is in a range of from 0.25 to 0.35 times the tread width TW. The tread width TW is a distance in the tire axial direction between the tread edges (Te) of the tire 1 in the standard state.

Each of the main grooves 3 is configured to have a zigzag shape in which first oblique portions (6a) and second oblique portions (6b) inclined in opposite directions to each other are arranged alternately in the tire circumferential direction, for example.

It is preferred that angles θ3 of each of the oblique portions (6a) and (6b) is in a range of from 5 to 15 degrees with respect to the tire circumferential direction, for example.

It is preferred that groove widths W1 of the crown main grooves 4 and groove widths W2 of the shoulder main grooves 5 are in a range of from 1.5% to 5.0% of the tread width TW, for example. It is preferred that the groove widths W2 of the shoulder main grooves 5 are larger than the groove widths W1 of the crown main grooves 4, for example. It is preferred that, in a case of a pneumatic tire for heavy duty, a groove depth of each of the main grooves 3 is in a range of from 10 to 25 mm, for example. The main grooves 3 configured as such are each helpful for improving wet performance and the uneven wear resistance performance in a good balance.

The land regions 10 include a crown land region 11, middle land regions 12, and shoulder land regions 13.

The crown land region 11 is defined between a pair of the crown main grooves 4. The middle land regions 12 are each defined between one of the crown main grooves 4 and its adjacent one of the shoulder main grooves 5. The shoulder land regions 13 are each defined axially outside each of the shoulder main grooves 5. Each of the land regions 10 is formed as a block row in which blocks 20 divided by lateral grooves each connecting between adjacent main grooves are arranged in the tire circumferential direction.

Figure 2:
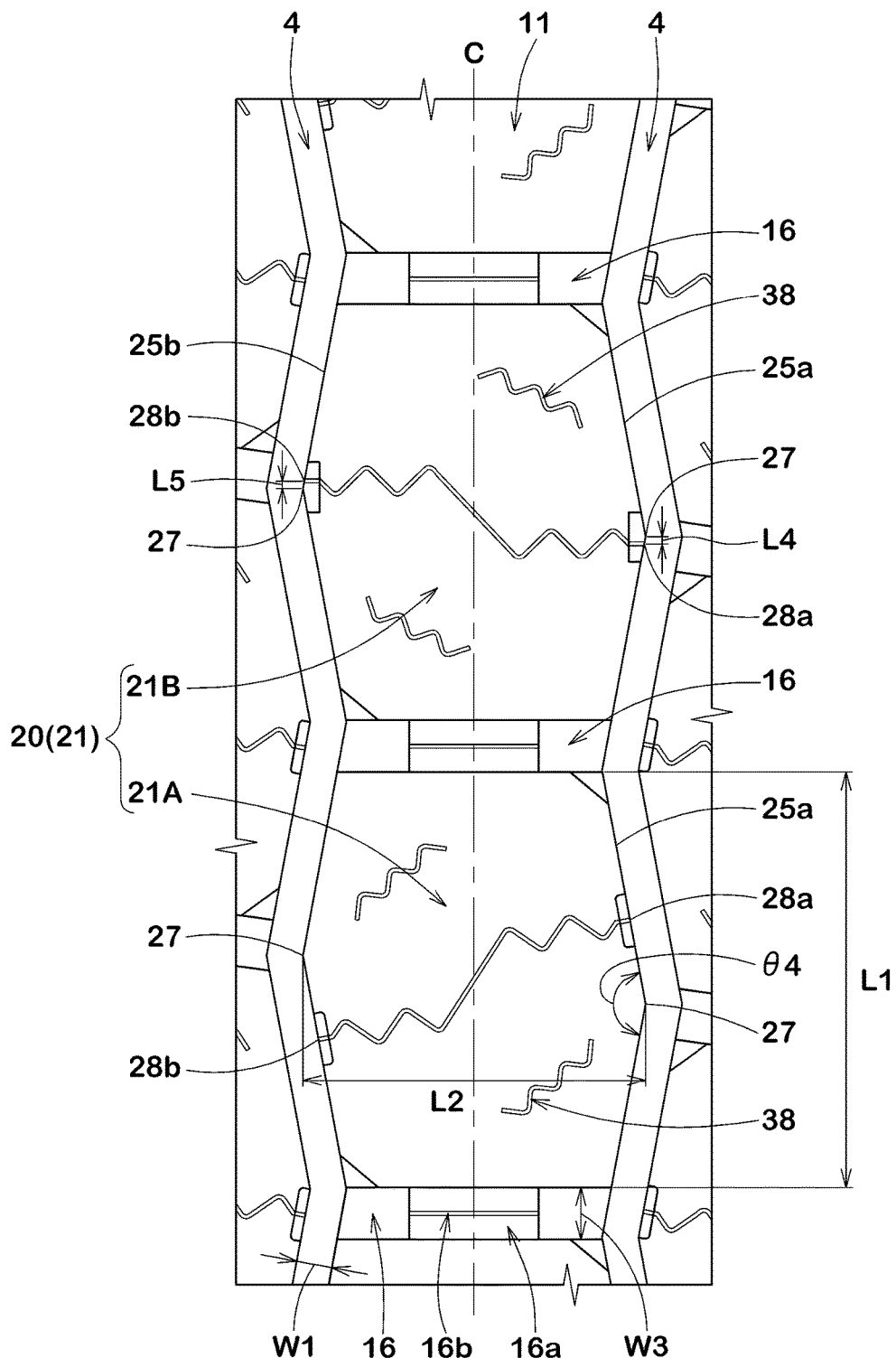
FIG. 2 is an enlarged view of a crown land region of FIG. 1.

FIG. 2 is an enlarged view of the crown land region 11. As shown in FIG. 2, the crown land region 11 includes a plurality of crown blocks 21 divided by a plurality of crown lateral grooves 16.

The crown lateral grooves 16 extend straight along the tire axial direction, for example, between a pair of the crown main grooves 4. It is preferred that groove widths W3 of the crown lateral grooves 16 are larger than the groove widths W1 of the crown main grooves 4, for example. The groove widths W3 are in a range of from 1.5 to 1.8 times the groove widths W1, for example.

The crown lateral grooves 16 in this embodiment is each provided with a tie bar (16a) formed by raising a groove bottom at a center portion thereof in the tire axial direction, for example. As a further preferred embodiment, the tie bar (16a) is provided with a groove bottom sipe (16b). However, the crown lateral grooves 16 are not limited to such a configuration. In this specification, "sipe" means a slit having a width not greater than 1.5 mm, and it is distinguished from a groove for drainage.

Figure 3:
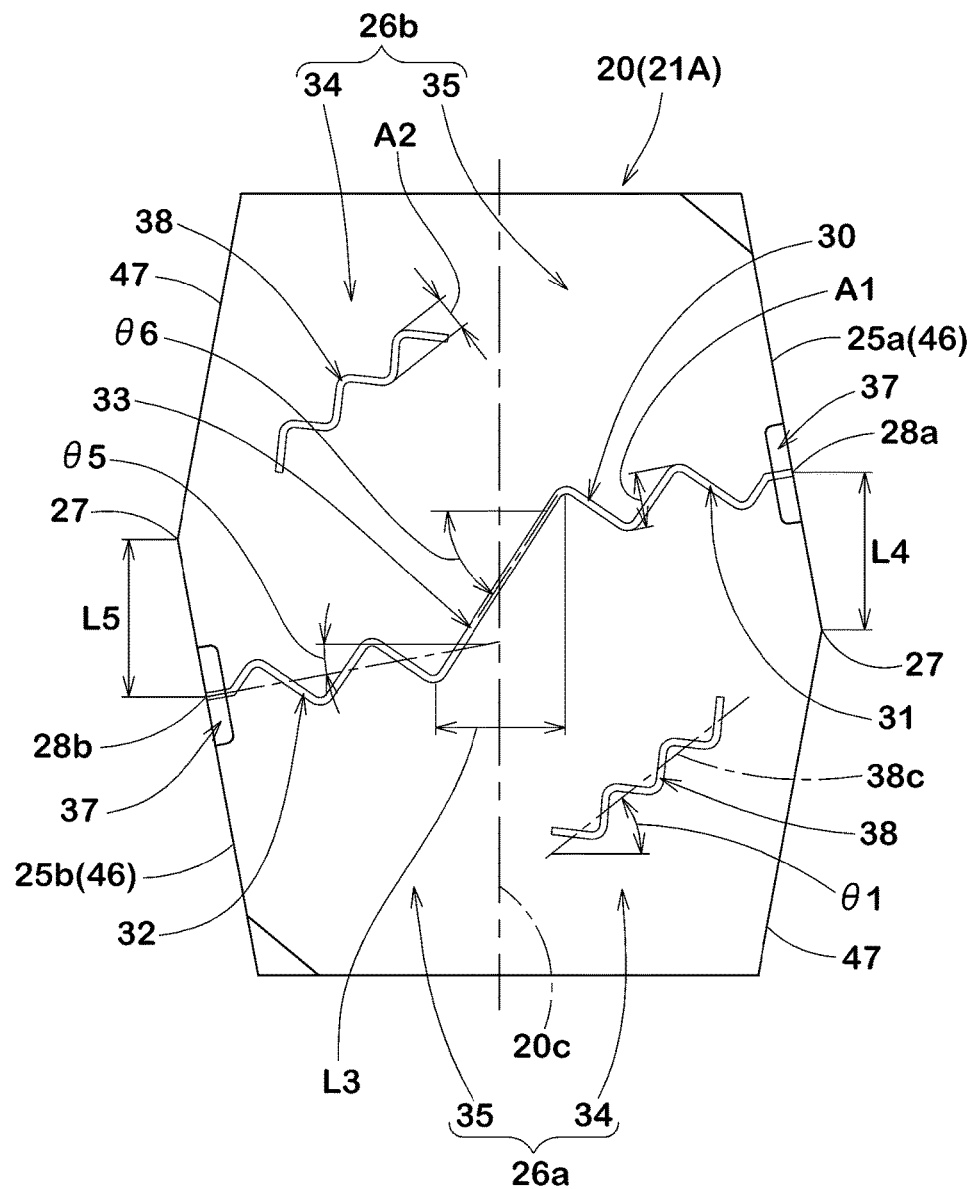
FIG. 3 is an enlarged view of a first crown block of FIG. 2.

FIG. 3 shows an enlarged view of a first crown block 21A of FIG. 2 as a figure for explaining one of the blocks 20 in this embodiment. As shown in FIG. 3, in a plan view of the tread portion 2, at least one of the blocks 20 is provided with a first block wall (25a), a second block wall (25b), and a crossing sipe 30 extending between the first block wall (25a) and the second block wall (25b).

Each of the first block wall (25a) and the second block wall (25b) extends along respective adjacent one of the main grooves 3 (shown in FIG. 1). In FIG. 3, the first block wall (25a) is arranged on the right side of the block 20, and the second block wall (25b) is arranged on the left side of the block 20. Each of the first block wall (25a) and the second block wall (25b) is configured in a convex V-shape so as to have an apex portion 27 protruding outside of the block. An angle θ4 (shown in FIG. 2) of a block wall at each of the apex portion 27 is in a range of from 140 to 170 degrees, for example. With the block walls configured as such, each of the blocks 20 has a substantially hexagonal ground contacting surface.

Each of the apex portions 27 is formed at a position shifted from a center position in the tire circumferential direction of the block, for example. Accordingly, each of the first block wall (25a) and the second block wall (25b) includes a long wall portion 46 and a short wall portion 47 having a smaller length in the tire circumferential direction than that of the long wall portion 46. The first block wall (25a) in this embodiment has the long wall portion 46 on a first side (upper side in FIG. 3) in the tire circumferential direction of the apex portion 27 and the short wall portion 47 on a second side (lower side in FIG. 3) in the tire circumferential direction of the apex portion 27, for example. The second block wall (25b) has the long wall portion 46 on the second side in the tire circumferential direction of the apex portion 27 and the short wall portion 47 on the first side in the tire circumferential direction of the apex portion 27, for example. It is preferred that the short wall portion 47 has a length in the tire circumferential direction in a range of from 0.75 to 0.90 times a length of the long wall portion 46 in the tire circumferential direction, for example. In this embodiment, a plurality of the blocks 20 having the first block walls (25a) and the second block walls (25b) configured as such is arranged in the tire circumferential direction.

In one block, it is preferred that the first block wall (25a) and the second block wall (25b) are configured to have shapes that are point symmetric with respect to each other. Thereby, it is possible that the uneven wear of the blocks 20 is suppressed.

The crossing sipe 30 extends between the first block wall (25a) and the second block wall (25b) so as to have a first end (28a) open to the first block wall (25a) and a second end (28b) open to the second block wall (25b). The blocks 20 having the crossing sipes 30 configured as such can moderately moderate stress applied to edges of the blocks when contacting a road surface, therefore, it is possible that heal and toe wear is suppressed, for example.

At least a part of the crossing sipe 30 is wavy. The blocks having the crossing sipes 30 configured as such can moderately moderate the stress applied to the edges of the blocks when contacting a road surface, therefore, it is possible that the heal and toe wear is suppressed, for example. Further, at least a part of the crossing sipe 30 is wavy, therefore, opposing sipe walls thereof are engaged with each other, thereby, it is possible that apparent rigidity of the block is increased. Therefore, the blocks having the crossing sipes 30 configured as such exert excellent uneven wear resistance performance and also are helpful for decreasing rolling resistance of the tire.

In the crossing sipe 30, the first end (28a) is arranged on the first side in the tire circumferential direction of the apex portion 27 of the first block wall (25a) and the second end (28b) is arranged on the second side in the tire circumferential direction of the apex portion 27 of the second block wall (25b).

The first end (28a) and the second end (28b) of the crossing sipe 30 configures as such are provided at positions shifted from the apex portions 27 of the block walls to which large stress is applied, therefore, the rigidity in the vicinity of the apex portions 27 is maintained, thereby, the uneven wear resistance performance of the block is improved. Further, the block 20 is divided into a first region (26a) and a second region (26b) by the crossing sipe 30, and each of the first region (26a) and the second region (26b) includes the apex portion of one of the block walls, therefore, the rigidity of each of the first region (26a) and the second region (26b) is increased in a good balance, thereby, uniform wear is obtained. Therefore, the uneven wear of the block is effectively suppressed.

The crossing sipe 30 includes, for example, a first portion 31 extending from the first end (28a), a second portion 32 extending from the second end (28b), and a third portion 33 extending between the first portion 31 and the second portion 32.

It is preferred that each of the first portion 31 and the second portion 32 extends in a wavy shape in the tire axial direction. The first portion 31 and the second portion 32 can be formed in various shapes such as a sine wave shape, a rectangular wave shape, a zigzag shape or the like, for example. In the first portion 31 and the second portion 32 configured as such, opposing sipe walls thereof are firmly engaged with each other, therefore, it is possible that the rigidity of the block is increased, thereby, the uneven wear resistance performance of the block is improved.

In order to further exert the above described effects, it is preferred that a peak-to-peak amplitude amount A1 of the first portion 31 and the second portion 32 is, for example, in a range of from 0.05 to 0.15 times a maximum length L1 (shown in FIG. 2) in the tire circumferential direction of the block 20.

It is preferred that a center line of the amplitude of each of the first portion 31 and the second portion 32 is inclined at an angle θ5 in a range of from 5 to 10 degrees with respect to the tire axial direction, for example.

It is preferred that the first portion 31 and the second portion 32 in this embodiment are formed at different positions in the tire circumferential direction, for example. The first portion 31 and the second portion 32 configured as such moderate the rigidity in the tire circumferential direction of each of the first region and the second region divided by the crossing sipe 30, therefore, it is possible that stress applied to the block 20 is further decreased.

As a further preferred embodiment, a length in the tire axial direction of the first portion 31 is the same as a length in the tire axial direction of the second portion 32. Thereby, the blocks 20 are likely to wear evenly, therefore, the uneven wear resistance performance is further improved.

The third portion 33 extends straight and obliquely with respect to the tire axial direction, for example. An angle θ6 of the third portion 33 with respect to the tire axial direction is in a range of from 40 to 60 degrees, for example. The third portion 33 configured as such, together with the first portion 31 and the second portion 32, is helpful for decreasing the stress applied to the block 20.

It is preferred that a length L3 in the tire axial direction of the third portion 33 is in a range of from 0.15 to 0.30 times a maximum length L2 (shown in FIG. 2) in the tire axial direction of the block 20, for example. As a further preferred embodiment, it is preferred that the length L3 of the third portion 33 is smaller than a length in the tire axial direction of the tie bar (16a) (shown in FIG. 2) provided in the crown lateral groove 16. The third portion 33 configured as such is helpful for improving the wet performance and the uneven wear resistance performance in a good balance.

A distance L4 in the tire circumferential direction between the apex portion 27 and the first end (28a) of the first block wall (25a) and a distance L5 in the tire circumferential direction between the apex portion 27 and the second end (28b) of the second block wall (25b) are in a range of from 0.01 to 0.40 times the maximum length L1 in the tire circumferential direction of the block, for example. As a preferred embodiment, in the first crown block 21A shown in FIG. 3, the distance L4 and the distance L5 are set to be, for example, in a range of from 0.15 to 0.25 times the maximum length L1. Thereby, positions of the ends of the crossing sipe 30 are appropriately spaced from the apex portions 27 and the lateral grooves, therefore, it is possible that wear starting from the ends is effectively suppressed.

As a further preferred embodiment, it is preferred that the first end (28a) and the second end (28b) of the crossing sipe 30 are connected with slots 37 included in the block walls 25a and 25b. Note that the slots 37 are slope surfaces, which are parts of the block walls (15a) and (15b) continuous with the ground contacting surface, in which angles thereof is partially increased with respect to a tire radial direction. Thereby, the uneven wear starting from the ends of the crossing sipe 30 is further suppressed.

Each of the first region (26a) and the second region (26b) defined on both sides in the tire circumferential direction of the crossing sipe 30 is divided into an apex portion side region 34 positioned on one side of a block center line (20c) and including respective one of the apex portion 27 of the first block wall (25a) and the second block wall (25b), and a non-apex portion side region 35 positioned on the other side of the block center line (20c) and having a smaller ground contacting surface area than that of the apex portion side region 34. Note that the block center line (20c) is a line extending in the tire circumferential direction passing through a center position in the tire axial direction of the maximum width of the block.

Each of the first region (26a) and the second region (26b) is provided with a closed sipe 38 having both ends terminating within the region. The closed sipe 38 further moderates the stress applied to the block while suppressing excessive deformation of each of the regions, therefore, it is possible that the uneven wear is further suppressed.

It is preferred that the closed sipe 38 in this embodiment is provided in the apex portion side region 34 of each of the first region (26a) and the second region (26b), for example. Entire body of the closed sipe 38 in this embodiment is formed within the apex portion side region 34 without extending across the block center line (20c). Thereby, decrease in rigidity of the non-apex portion side region 35 is suppressed, therefore, the uneven wear of each of the regions is suppressed.

It is preferred that the closed sipe 38 extend in a wavy shape, for example. The closed sipe 38 can be configured to have various shapes such as a sine wave shape, a rectangular wave shape, a zigzag shape, and the like, for example. It is preferred that a peak-to-peak amplitude amount A2 of the closed sipe 38 is smaller than the amplitude amount A1 of the first portion 31 or the second portion 32, for example. In the closed sipe 38 configured as such, opposing sipe walls thereof are moderately engaged with each other, therefore, it is possible that deformation of each of the regions is suppressed.

It is preferred that a center line (38c) of the amplitude of the wavy shape of the closed sipe 38 is inclined in the same direction as the third portion 33. It is preferred that the closed sipe 38 provided in each of the crown blocks 21 extends along the third portion 33 of the crossing sipe 30 provided in the same block, for example. Note that the zigzag closed sipe 38 extending along the third portion 33 means that the center line (38c) of the amplitude of the closed sipe 38 is inclined to the same extent as the third portion 33. It is preferred that an angle θ1 of the center line (38c) with respect to the tire axial direction is, for example, in a range of from 30 to 50 degrees.

In each of the crown blocks 21, it is preferred that the closed sipe 38 arranged in the first region (26a) and the closed sipe 38 arranged in the second region (26b) are formed so that they do not overlap each other in the tire axial direction. By such an arrangement of the closed sipes 38, it is possible that excessive decrease in rigidity of the block is suppressed.

From a similar point of view, it is preferred that the closed sipes 38 have smaller depths than the crossing sipes 30, for example. Specifically, it is preferred that the depths of the closed sipes 38 are in a range of from 0.20 to 0.50 times the depths of the main grooves.

As shown in FIG. 2, for example, the crown blocks 21 in this embodiment includes the above-described first crown blocks 21A and second crown blocks 21B having a different arrangement of the crossing sipes 30. The first crown blocks 21A and the second crown blocks 21B are arranged alternately in the tire circumferential direction.

In the second crown block 21B, for example, the first end (28a) of the crossing sipe 30 is positioned on the second side (lower side in FIG. 2) of the apex portion 27 and the second end (28b) of the crossing sipe 30 is positioned on the first side (upper side in FIG. 2) of the apex portion 27. The first crown block 21A and the second crown block 21B which have different arrangements of the crossing sipes 30 have different parts which are likely to wear, therefore, it is possible that the parts which are likely to wear are dispersed in the entire crown land region 11.

In order to further exert the above-mentioned effects, it is preferred that the distance L4 in the tire circumferential direction between the apex portion 27 and the first end (28a) of the first block wall (25a) and the distance L5 in the tire circumferential direction between the apex portion 27 and the second end (28b) of the second block wall (25b) of the second crown block 21B are smaller than the distance L4 and the distance L5 of the first crown block 21A. Specifically, it is preferred that the distance L4 and the distance L5 of the second crown block 21B are, for example, in a range of from 1.5% to 5.0% of the maximum length L1 in the tire circumferential direction of the second crown block 21b.

It is preferred that the closed sipe 38 provided in the first crown block 21A and the closed sipe 38 provided in the second crown blocks 21b are inclined in opposite directions to each other. Thereby, edges of each of the sipes exert frictional force in many directions, therefore, the wet performance is improved.

Figure 4:
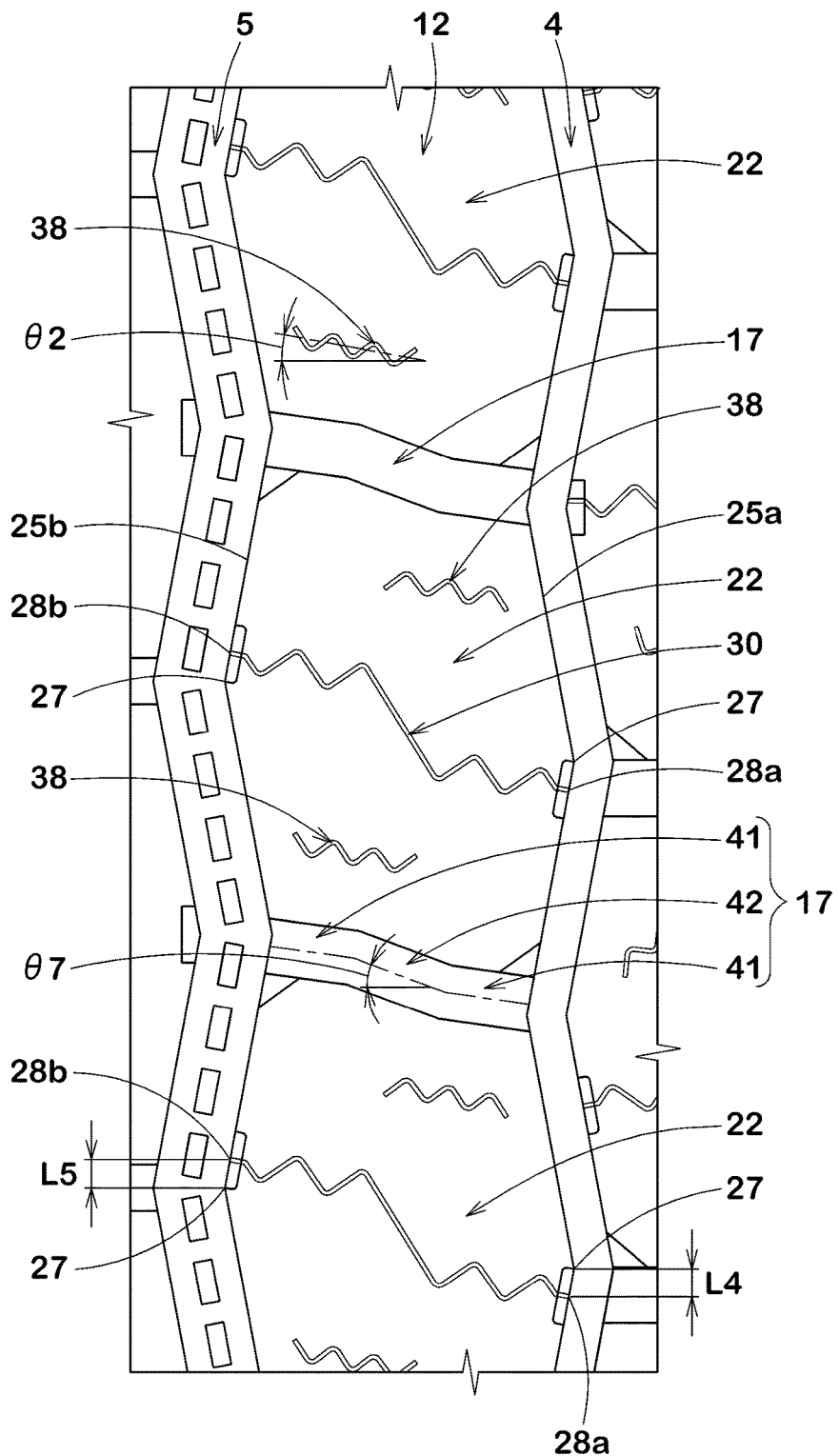
FIG. 4 is an enlarged view of one of middle land regions of FIG. 1.

FIG. 4 shows an enlarged view of one of the middle land regions 12 of FIG. 1. As shown in FIG. 4, the middle land region 12 includes a plurality of middle blocks 22 divided by a plurality of middle lateral grooves 17.

The middle lateral grooves 17 extend obliquely at angles θ7 in a range of from 5 to 25 degrees with respect to the tire axial direction, for example. The middle lateral grooves 17, for example, at least partly bent. As a further preferred embodiment, each of the middle lateral grooves 17 in this embodiment includes a pair of first lateral groove portions 41 and a second lateral groove portion 42. Each of the first lateral groove portion 41 is connected with, for example, either one of the crown main grooves 4 or the shoulder main groove 5. The second lateral groove portion 42 is disposed between the pair of the first lateral groove portions 41 and is inclined at an angle larger than the first lateral groove portions 41 with respect to the tire axial direction, for example. Thereby, during running on a wet road surface, water in the first lateral groove portions 41 is smoothly guided toward the main grooves, therefore, the wet performance is improved.

The middle blocks 22 in this embodiment have, for example, the same configuration as the crown blocks 21 described above. That is, each of the middle blocks 22 has the above-mentioned block walls (25a) and (25b) and the crossing sipe 30 and the closed sipes 38. Note that, in the middle blocks 22 shown in FIG. 4, the same reference numbers are given to components common to the crown blocks 21 shown in FIG. 3.

In each of the middle blocks 22, the first end (28a) of the crossing sipe 30 is positioned on the second side (lower side in FIG. 4) of the apex portion 27 of the first block wall (25a) and the second end (28b) is positioned on the first side (upper side in FIG. 4) of the apex portion 27 of the second block wall (25b).

In each of the middle blocks 22, it is preferred that the distance L4 and the distance L5 are, for example, in a range of from 3.0% to 6.0% of the maximum length L1 in the tire circumferential direction of the block.

It is preferred that the closed sipes 38 provided in each of the middle blocks 22 are inclined in the same direction. It is preferred that the closed sipes 38 extend along the first portion 31 or the second portion 32 of the crossing sipe 30 provided in the same block, for example. Note that the zigzag closed sipe 38 extending along the zigzag first portion 31 or the second portion 32 means that the center line of the amplitude of each of the closed sipes 38 and the center line of the amplitude of the first portion 31 or the second portion 32 are inclined to the same extent.

It is preferred that the center line of the amplitude of the wavy closed sipe 38 arranged in the middle block 22 is preferably inclined at an angle θ2 smaller than the angle θ1 with respect to the tire axial direction. Specifically, it is preferred that the angle θ2 is, for example, in a range of from 5 to 15 degrees.

From the same viewpoint, in each of the middle blocks 22, it is preferred that the closed sipe 38 provided in the first region (26a) and the closed sipe 38 provided in the second region (26b) are formed so as to overlap each other in the tire axial direction.

As shown FIG. 1, it is preferred that at least one of the closed sipes 38 provided in each of the middle blocks 22 is formed at a position so as to overlap with a region obtained by projecting the first portion 31 or the second portion 32 of the crossing sipe 30 of one of the first crown blocks 21A in the tire axial direction. Thereby, it becomes easy for the middle blocks 22 and the first crown blocks 21A together to follow a road surface, therefore, it is possible that the rolling resistance is decreased.

In order to exert the above described effects, it is preferred that formation widths Si in the tire circumferential direction of the closed sipes 38 provided in the middle blocks 22 are, for example, in a range of from 5% to 10% of the maximum lengths L1 (shown in FIG. 2) in the tire circumferential direction of the first crown blocks 21A. Further, it is preferred that the closed sipe 38 provided in the middle block 22 is formed, for example, within a range of 10% of the maximum length L1 on both sides in the tire circumferential direction from the end of the crossing sipe 30 formed in adjacent one of the first crown blocks 21A.

Figure 5:
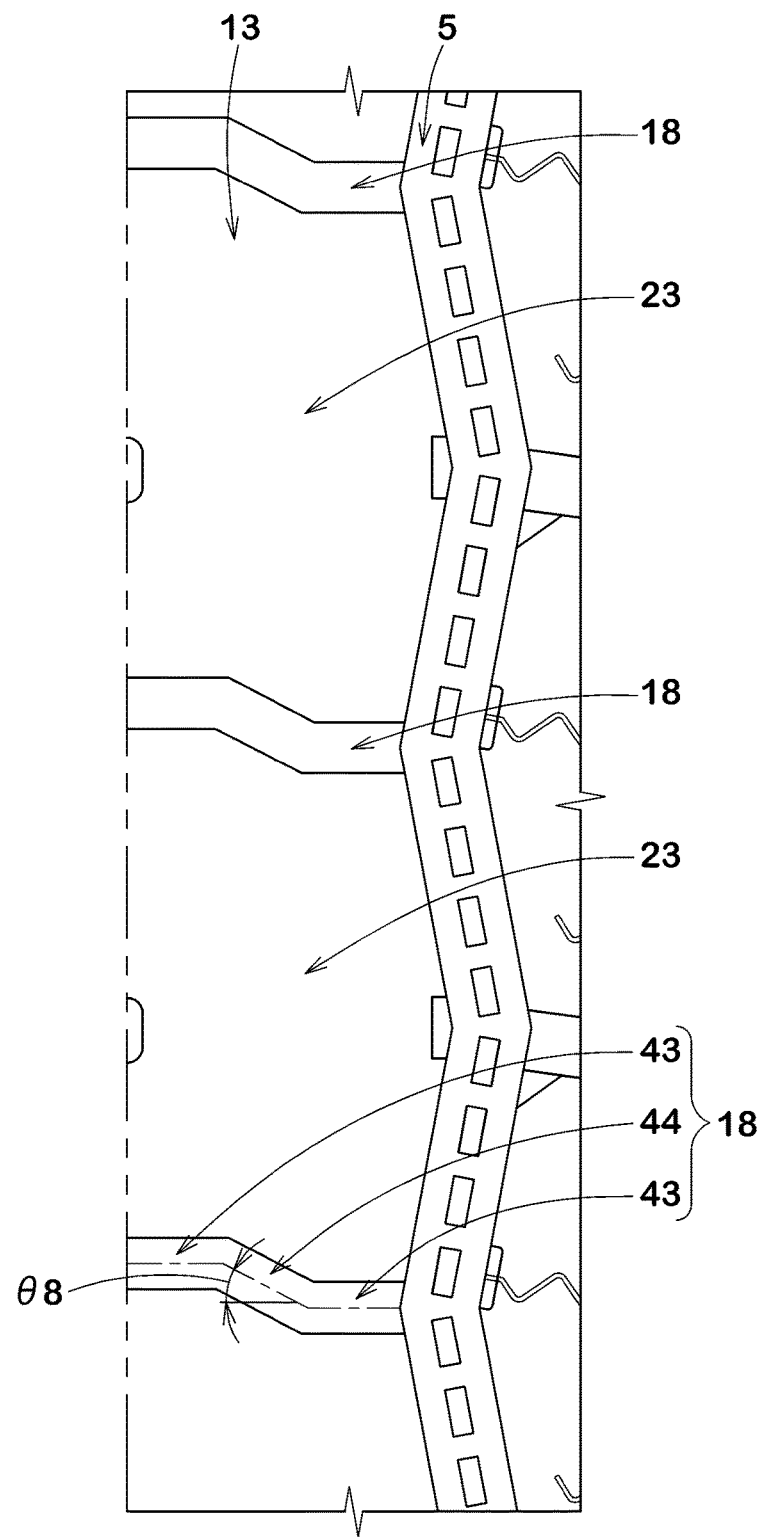
FIG. 5 is an enlarged view of one of shoulder land regions of FIG. 1.

FIG. 5 shows an enlarged view of one of the shoulder land regions 13 of FIG. 1. As shown in FIG. 5, each of the shoulder land regions 13 includes, for example, a plurality of shoulder blocks 23 divided by a plurality of shoulder lateral grooves 18.

Each of the shoulder lateral grooves 18 includes, for example, a pair of first lateral groove portions 43 extending along the tire axial direction and a second lateral groove portion 44 extending obliquely with respect to the tire axial direction between the first lateral groove portions 43. Inclination angles θ8 of the second lateral groove portions 44 are, for example, in a range of from 25 to 35 degrees with respect to the tire axial direction.

As a preferred embodiment, groove depths of the shoulder lateral grooves 18 are, for example, in a range of from 0.05 to 0.25 times groove depths of the shoulder main grooves 5. Thereby, the shoulder land regions 13 having high rigidity are arranged on both sides of the tread portion, therefore, the ground contacting load applied to the crown land region 11 and the middle land regions 12 (shown in FIG. 1) is moderated. Therefore, the uneven wear resistance performance of the crown land region 11 and the middle land regions 12 is further improved.

Each of the shoulder blocks 23 in this embodiment, for example, has a ground contacting surface elongated in the tire circumferential direction. As a preferred embodiment, the ground contacting surfaces of the shoulder blocks 23 are not provided with sipes. The shoulder blocks 23 configured as such can exert excellent durability.

While detailed description has been made of the tire as an embodiment of the present invention, the present invention can be embodied in various forms without being limited to the illustrated embodiment.

Working Example (Example)

Tires for heavy duty of size 11R22.5 having the basic pattern shown in FIG. 1 were made by way of test according to the specifications listed in Table 1. As Reference 1, a tire in which the ends of the crossing sipe were positioned at the apex portions of the block walls and no closed sipes were formed was made by way of test. As Reference 2, a tire having the same arrangement of the crossing sipes as the basic pattern shown in FIG. 1 and no closed sipes provided therein was made by way of test. The tires as Reference 1 and Reference 2 have substantially the same configuration as the tire shown in FIG. 1 except for the above-described configuration. The test tires were tested for the wet performance, wear resistance, and presence or absence of the uneven wear. Common specifications and test methods of the test tires are as follows.

Rim: 22.5×8.25
Tire pressure: 720 kPa
Test car: 10-ton truck loaded 50% of standard load capacity at front of loading platform
Tire mounting position: all wheels <Wet Performance>

The test car was driven under the following conditions and transit time for the test car to run on a test course of 10 meter in total length was measured. The results are indicated by an index based on the transit time of Reference 1 being 100, wherein smaller numerical value is better.

Road surface: asphalt road surface with puddle having depth of 5 mm
Starting method: start by clutching at second gear speed fixed at 1500 rpm <Wear Resistance>

The test car was driven on a dry road surface for a predetermined distance and then wear amount of the crown block was measured. The results are indicated by an index based on the wear amount of the crown block of Reference 1 being 100, wherein the smaller the numerical value, the better the wear resistance.

<Presence or Absence of Uneven Wear>

The test car was driven on a dry road surface for a predetermined distance and then presence or absence of the uneven wear of the apex portions of the block walls and the heel and toe wear was confirmed.

The test results are shown in Table 1. Note that the parameters of the examples of Table 1 are those of the first crown blocks.

TABLE 1

|  | Ref. 1 | Ref. 2 | Ex. 1 | Ex. 2 | Ex. 3 | Ex. 4 | Ex. 5 |
| --- | --- | --- | --- | --- | --- | --- | --- |
| Distances L4 and L5 between end of Crossing sipe and Apex portion/ Maximum length L1 of the block in the tire circumferential direction | 0 | 0.20 | 0.20 | 0.15 | 0.18 | 0.22 | 0.25 |
| Amplitude amounts A1 of First and Second portions/Maximum length L1 of the block in the tire circumferential direction | 0.07 | 0.07 | 0.07 | 0.07 | 0.07 | 0.07 | 0.07 |
| Length L3 of Third portion/ Maximum length L2 of the block in the tire axial direction | 0.27 | 0.27 | 0.20 | 0.20 | 0.20 | 0.20 | 0.20 |
| Presence or absence of Closed sipe | Absence | Absence | Presence | Presence | Presence | Presence | Presence |
| Angle θ1 of Center line of Closed sipe [degree] | — | — | 35 | 35 | 35 | 35 | 35 |
| Wet performance [index] | 100 | 102 | 95 | 94 | 95 | 96 | 97 |
| Wear resistance [index] | 100 | 98 | 95 | 97 | 96 | 95 | 95 |
| Presence or absence of Uneven wear | Presence | Presence | Absence | Absence | Absence | Absence | Absence |

TABLE 1-continued

| | Ex. 6 | Ex. 7 | Ex. 8 | Ex. 9 | Ex. 10 | Ex. 11 | Ex. 12 | Ex. 13 |
|---|---|---|---|---|---|---|---|---|
| Distances L4 and L5 between end of Crossing sipe and Apex portion/Maximum length L1 of the block in the tire circumferential direction | 0.20 | 0.20 | 0.20 | 0.20 | 0.20 | 0.20 | 0.20 | 0.20 |
| Amplitude amounts A1 of First and Second portions/Maximum length L1 of the block in the tire circumferential direction | 0.05 | 0.15 | 0.07 | 0.07 | 0.07 | 0.07 | 0.07 | 0.07 |
| Length L3 of Third portion/Maximum length L2 of the block in the tire axial direction | 0.20 | 0.20 | 0.15 | 0.30 | 0.20 | 0.20 | 0.20 | 0.20 |
| Presence or absence of Closed sipe | Presence | Presence | Presence | Presence | Presence | Presence | Presence | Presence |
| Angle θ1 of Center line of Closed sipe [degree] | 35 | 35 | 35 | 35 | 25 | 30 | 40 | 45 |
| Wet performance [index] | 95 | 96 | 96 | 94 | 96 | 95 | 95 | 93 |
| Wear resistance [index] | 97 | 94 | 95 | 97 | 96 | 95 | 96 | 97 |
| Presence or absence of Uneven wear | Absence | Absence | Absence | Absence | Absence | Absence | Absence | Absence |

As is clear from Table 1, it was confirmed that the uneven wear was suppressed in the tires as the examples.

Tires for heavy duty of size 11R22.5 having the basic pattern shown in FIG. 1 were made by way of test according to the specifications listed in Table 1. As Reference 3, a tire in which the ends of each of the crossing sipes were positioned at the apex portions of the block walls was made by way of test. As Reference 4, a tire in which only a plurality of the first crown blocks were arranged in the tire circumferential direction in the crown land region was made by way of test. In other words, in the tire as Reference 4, all of the crossing sipes provided in the crown land region are inclined to the same direction. Note that the tires as Reference 3 and Reference 4 have substantially the same configuration as the tire shown in FIG. 1 except for the above-described configuration. Each of the test tires was tested for the above described wet performance, the wear resistance, presence or absence of the uneven wear, and the rolling resistance. Common specifications and test methods of the test tires are as follows.

Rim: 22.5×8.25
Tire pressure: 720 kPa
Test car: 10-ton truck loaded 50% of standard load capacity at front of loading platform
Tire mounting position: all wheels <Wet Performance>

The test car was driven under the following conditions and transit time for the test car to run on a test course of 10 meter in total length was measured. The results are indicated by an index based on the transit time of Reference 3 being 100, wherein smaller numerical value is better.

Road surface: asphalt road surface with puddle having depth of 5 mm
Starting method: start by clutching at second gear speed fixed at 1500 rpm <Wear Resistance>

The test car was driven on a dry road surface for a predetermined distance and then wear amount of the crown block was measured. The results are indicated by an index based on the wear amount of the crown block of Reference 3 being 100, wherein the smaller the numerical value, the better the wear resistance.

<Presence or Absence of Uneven Wear>

The test car was driven on a dry road surface for a predetermined distance and then presence or absence of the uneven wear of the apex portions of the block walls and the heel and toe wear was confirmed.

<Rolling Resistance>

By using a rolling resistance tester, the rolling resistance was measured under the following conditions. The results are indicated by an index based on the value of Reference 3 being 100, wherein the smaller the numerical value, the smaller the rolling resistance, which is better.

Tire load: 25.01 kN
Running speed: 80 km/h

The test results are shown in Table 2. Note that the parameters of the examples of Table 2 are those of the first crown blocks.

TABLE 2

| | Ref. 3 | Ref. 4 | Ex. 1 | Ex. 2 | Ex. 3 | Ex. 4 | Ex. 5 |
|---|---|---|---|---|---|---|---|
| Distances L4 and L5 between end of Crossing sipe and Apex portion/Maximum length L1 of the block in the tire circumferential direction | 0 | 0.20 | 0.20 | 0.15 | 0.18 | 0.22 | 0.25 |
| Amplitude amounts A1 of First and Second portions/Maximum length L1 of the block in the tire circumferential direction | 0.07 | 0.07 | 0.07 | 0.07 | 0.07 | 0.07 | 0.07 |
| Length L3 of Third portion/Maximum length L2 of the block in the tire axial direction | 0.27 | 0.27 | 0.20 | 0.20 | 0.20 | 0.20 | 0.20 |

TABLE 2-continued

|  | | | | | | | |
|---|---|---|---|---|---|---|---|
| Presence or absence of Second crown block | Presence | Absence | Presence | Presence | Presence | Presence | Presence |
| Formation width S1 of Closed sipe of Middle block/Maximum length L1 of the block in the tire circumferential direction [%] | 8.5 | 8.5 | 8.5 | 8.5 | 8.5 | 8.5 | 8.5 |
| Wet performance [index] | 100 | 98 | 95 | 94 | 95 | 97 | 98 |
| Wear resistance [index] | 100 | 100 | 95 | 97 | 96 | 95 | 95 |
| Presence or absence of Uneven wear | Presence | Presence | Absence | Absence | Absence | Absence | Absence |
| Rolling resistance [index] | 100 | 100 | 100 | 102 | 101 | 98 | 97 |

|  | Ex. 6 | Ex. 7 | Ex. 8 | Ex. 9 | Ex. 10 | Ex. 11 | Ex. 12 | Ex. 13 |
|---|---|---|---|---|---|---|---|---|
| Distances L4 and L5 between end of Crossing sipe and Apex portion/Maximum length L1 of the block in the tire circumferential direction | 0.20 | 0.20 | 0.20 | 0.20 | 0.20 | 0.20 | 0.20 | 0.20 |
| Amplitude amounts A1 of First and Second portions/Maximum length L1 of the block in the tire circumferential direction | 0.05 | 0.15 | 0.07 | 0.07 | 0.07 | 0.07 | 0.07 | 0.07 |
| Length L3 of Third portion/Maximum length L2 of the block in the tire axial direction | 0.20 | 0.20 | 0.15 | 0.30 | 0.20 | 0.20 | 0.20 | 0.20 |
| Presence or absence of Second crown block | Presence | Presence | Presence | Presence | Presence | Presence | Presence | Presence |
| Formation width S1 of Closed sipe of Middle block/Maximum length L1 of the block in the tire circumferential direction [%] | 8.5 | 8.5 | 8.5 | 8.5 | 3.0 | 5.0 | 10.0 | 12.0 |
| Wet performance [index] | 95 | 96 | 96 | 94 | 97 | 95 | 94 | 93 |
| Wear resistance [index] | 96 | 96 | 95 | 97 | 94 | 95 | 95 | 96 |
| Presence or absence of Uneven wear | Absence | Absence | Absence | Absence | Absence | Absence | Absence | Absence |
| Rolling resistance [index] | 100 | 99 | 100 | 101 | 99 | 100 | 101 | 102 |

As is clear from Table 2, it was confirmed that the uneven wear was suppressed in the tires as the examples.

The invention claimed is:

1. A tire comprising:
a tread portion comprising
a plurality of main grooves extending continuously in a tire circumferential direction,
a crown land region defined between a pair of the main grooves adjacent to each other,
a plurality of crown blocks divided by a plurality of crown lateral grooves connecting between the pair of the main grooves,
a middle land region defined between another pair of the main grooves adjacent to each other,
a plurality of middle blocks divided by a plurality of middle lateral grooves connecting between the another pair of the main grooves,
the crown blocks and the middle blocks each having a first block wall and a second block wall abutting on the main grooves on both sides of the block, and being provided with a crossing sipe extending between the first block wall and the second block wall so as to have a first end thereof connected with the first block wall and a second end thereof connected with the second block wall, and a first region and a second region divided by the crossing sipe and positioned on both sides thereof in the tire circumferential direction, wherein
in a plan view of each of the blocks each of the crown blocks and the middle blocks,
the first block wall and the second block wall are each formed in a convex V-shape so as to have an apex portion protruding toward the outside of the block,
the crown blocks include
first crown blocks whose crossing sipes each have the first end positioned on a first side in the tire circumferential direction of the apex portion of the first block wall and the second end positioned on a second side in the tire circumferential direction of the apex portion of the second block wall, and
second crown blocks whose crossing sipes each have the first end positioned on the second side of the apex portion of the first block wall and the second end positioned on the first side of the apex portion of the second block wall,
in each of the middle blocks, the first end of the crossing sipe is positioned on the second side in the tire circumferential direction of the apex portion of the first block wall and the second end of the crossing sipe is positioned on the first side in the tire circumferential direction of the apex portion of the second block wall,
each of the first region and the second region is provided with a closed sipe having both ends terminating within the region,
in each of the crown blocks, the closed sipe provided in the first region and the closed sipe provided in the second region do not overlap each other in a tire axial direction, in each of the middle blocks, the closed sipe provided in the first region and the closed sipe provided in the second region overlap each other in the tire axial direction, each of the crossing sipes comprises
- a first portion extending from the first end in a wavy shape in the tire axial direction,
- a second portion extending from the second end in a wavy shape in the tire axial direction, and
- a third portion extending straight between the first portion and the second portion, the closed sipes extend in wavy shapes, and the third portion is inclined at a larger angle than center lines of amplitudes of the wavy shapes of the closed sipes with respect to the tire axial direction.

2. The tire according to claim 1,
wherein at least a part of the crossing sipe is wavy.

3. The tire according to claim 1,
wherein at least a part of the crossing sipe extends straight.

4. The tire according to claim 1, wherein
the first portion and the second portion are formed at different positions in the tire circumferential direction, and
the third portion is inclined with respect to the tire axial direction.

5. The tire according to claim 1, wherein
the center lines of the amplitudes of the wavy shapes of the closed sipes are inclined to same directions as the third portion.

6. The tire according to claim 1, wherein
the closed sipe provided in the first region and the closed sipe provided in the second region do not overlap each other when viewed in the tire axial direction.

7. The tire according to claim 1, wherein
each of the first region and the second region is divided into an apex portion side region and a non-apex portion side region by a block center line extending in the tire circumferential direction passing through a center position in the tire axial direction of a maximum width of the block provided with the crossing sipe,
the apex portion side region is positioned on one side of the block center line and includes the apex portion of the first block wall or the second block wall,
the non-apex portion side region is positioned on the other side of the block center line to have a smaller ground contacting surface area than the apex portion side region, and
the closed sipes of the first region and the second region are provided in the respective apex portion side regions.

8. The tire according to claim 6, wherein
an entire body of each of the closed sipes is formed within the apex portion side region.

9. The tire according to claim 1, wherein
the first crown blocks and the second crown blocks are arranged alternately in the tire circumferential direction.

10. The tire according to claim 1, wherein
the closed sipes provided in the first crown blocks and the closed sipes provided in the second crown blocks are inclined to opposite directions to each other.

11. The tire according to claim 1, wherein
the closed sipe provided in each of the crown blocks extends along the third portion of the crossing sipe provided in the same block.

12. The tire according to claim 1, wherein
the closed sipes provided in the middle blocks are inclined to same directions.

13. The tire according to claim 1, wherein
the closed sipes provided in each of the middle blocks extend along the first portion or the second portion of the crossing sipe provided in the same block.

14. The tire according to claim 1, wherein
the center lines of the amplitudes of the wavy shapes of the closed sipes provided in the crown blocks are inclined at angles $\theta 1$ with respect to the tire axial direction, and
the center lines of the amplitudes of the wavy shapes of the closed sipes provided in the middle blocks are inclined at angles $\theta 2$ smaller than the angles $\theta 1$ with respect to the tire axial direction.

15. The tire according to claim 1, wherein
at least one of the closed sipes provided in the middle blocks is formed at a position so as to overlap with a region obtained by projecting the first portion or the second portion of the crossing sipe of one of the crown blocks in the tire axial direction.

16. The tire according to claim 1, wherein
a groove width of each of the crown lateral grooves and the middle lateral grooves is larger than a groove width of at least one of the main grooves on both sides thereof in the tire axial direction.

17. The tire according to claim 1, wherein
each of the wavy shapes of the first portion and the second portion has a plurality of peaks.

18. The tire according to claim 1, wherein
each of the first end and the second end is connected with a slot included in respective one of the first block wall and the second block wall.

* * * * *